(12) United States Patent (10) Patent No.: US 8,782,450 B2
Cepulis et al. (45) Date of Patent: Jul. 15, 2014

(54) POWER CAPPING SYSTEM AND METHOD

(75) Inventors: Darren J. Cepulis, Houston, TX (US); Chanh V. Hua, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 338 days.

(21) Appl. No.: 13/262,809

(22) PCT Filed: Apr. 17, 2009

(86) PCT No.: PCT/US2009/040887
§ 371 (c)(1),
(2), (4) Date: Oct. 3, 2011

(87) PCT Pub. No.: WO2010/120305
PCT Pub. Date: Oct. 21, 2010

(65) Prior Publication Data
US 2012/0030493 A1 Feb. 2, 2012

(51) Int. Cl.
*G06F 1/32* (2006.01)
*G06F 1/00* (2006.01)

(52) U.S. Cl.
CPC .................................... *G06F 1/324* (2013.01)
USPC ........................................... 713/320; 713/323

(58) Field of Classification Search
USPC .................................................. 713/320, 323
See application file for complete search history.

(56) References Cited

U.S. PATENT DOCUMENTS

| | | | | |
|---|---|---|---|---|
| 5,953,536 | A * | 9/1999 | Nowlin, Jr. ................... | 713/323 |
| 8,255,709 | B2 * | 8/2012 | McCarthy et al. ............ | 713/300 |
| 8,276,012 | B2 * | 9/2012 | Hanson et al. ................ | 713/320 |
| 2004/0123163 | A1 | 6/2004 | Huang | |
| 2005/0144491 | A1 | 6/2005 | Zayas | |
| 2006/0190745 | A1 | 8/2006 | Matsushima et al. | |
| 2006/0248354 | A1 * | 11/2006 | Pineda De Gyvez et al. | 713/300 |
| 2006/0294400 | A1 * | 12/2006 | Diefenbaugh et al. ........ | 713/300 |
| 2007/0013361 | A1 * | 1/2007 | Burlak et al. ................. | 324/142 |
| 2007/0180280 | A1 * | 8/2007 | Bolan et al. .................. | 713/300 |
| 2007/0245161 | A1 | 10/2007 | Shaw et al. | |
| 2008/0104430 | A1 * | 5/2008 | Malone et al. ................ | 713/300 |
| 2008/0114998 | A1 | 5/2008 | Ferentz et al. | |
| 2009/0063882 | A1 * | 3/2009 | Chang .......................... | 713/320 |
| 2009/0177907 | A1 * | 7/2009 | Sotomayor et al. ........... | 713/340 |
| 2010/0030392 | A1 * | 2/2010 | Ferentz et al. ................ | 700/295 |
| 2010/0058091 | A1 * | 3/2010 | Lambert et al. ............... | 713/330 |
| 2012/0331317 | A1 * | 12/2012 | Rogers et al. ................. | 713/320 |

FOREIGN PATENT DOCUMENTS

| | | |
|---|---|---|
| CN | 100381978 | 4/2008 |
| TW | 200411366 | 7/2004 |

OTHER PUBLICATIONS

CN—Chinese Office Action cited in appl. 200980158787.1; dated Sep. 10, 2013; 8 pages.

* cited by examiner

*Primary Examiner* — Paul R Myers
*Assistant Examiner* — Christopher A Daley

(57) ABSTRACT

A system, and a corresponding method, for temporarily capping power consumption includes a mechanism for determining total power consumption by a number of components, a mechanism for disconnecting and reconnecting power to one or more of the components, and a mechanism for determining when to disconnect and reconnect power to the components.

20 Claims, 4 Drawing Sheets

POWER CAPPING SYSTEM AND METHOD

BACKGROUND

Computer systems can draw significant amounts of power from their associated power supplies. In some instances, workloads executing on the computer system may place such a demand on the computer system's processors that the rated power of the power supplies is exceeded. Exceeding rated power increases heat output of the computer system, with consequent demands on the computer system's cooling infrastructure as well as possible damage to computer system components. Exceeding rated power also can cause an unintended loss of computer system components, such as by tripping circuit breakers.

DESCRIPTION OF THE DRAWINGS

The detailed description will refer to the following drawings in which like numerals refer to like objects, and in which.

DETAILED DESCRIPTION

In any computer system, the processor complex will typically constitute the largest power consumer. This power consumption is direct in the sense that workloads executing on the processor require the processor to consume power, and as workload demands increase, processor power consumption increases. The power consumption also is indirect in that increased processor demand may increase the use of memory and peripherals, and will generate more heat, thereby requiring increased cooling system operation.

Power consumption in a processor complex may be controlled, or lowered, by lowering the core frequency of the processors (for example, lowering core frequency from 3.0 GHz to 2.0 GHz). Power consumption also may be lowered by controlling the average, effective frequency of the CPU clock. To implement power consumption control using frequency and CPU clock control mechanisms (sometimes referred to as CPU down-clocking), the processor complex may have installed a software routine that monitors processor power consumption and adjusts one or both of core frequency and GPU clock when processor power consumption reaches a specified threshold. This threshold may be adjustable and set by a system administrator. However, this approach to limiting, or lowering, processor power consumption is relatively slow, and may take 30 seconds or more before processor power consumption is reduced to the specified threshold.

By instituting a processor power capping regime as discussed above, a system administrator or designer then can determine the cooling system requirements for the computer system. However, the use of such a power capping regime does not necessarily allow the system designer to limit the size and quantity of the system's power supplies. This is because while the power capping regime described above can maintain average processor power consumption at or below an specified threshold, the regime cannot limit the almost instantaneous spikes in power consumption that occur when processor workloads suddenly increase.

To improve power capping performance on a computer system, disclosed herein is an enhanced power capping system, and corresponding method, that augments CPU down-clocking to control power consumption in a more dynamic fashion such that power spikes above the set power consumption threshold are eliminated or at least reduced in duration to small fractions of a second.

Figure 1:
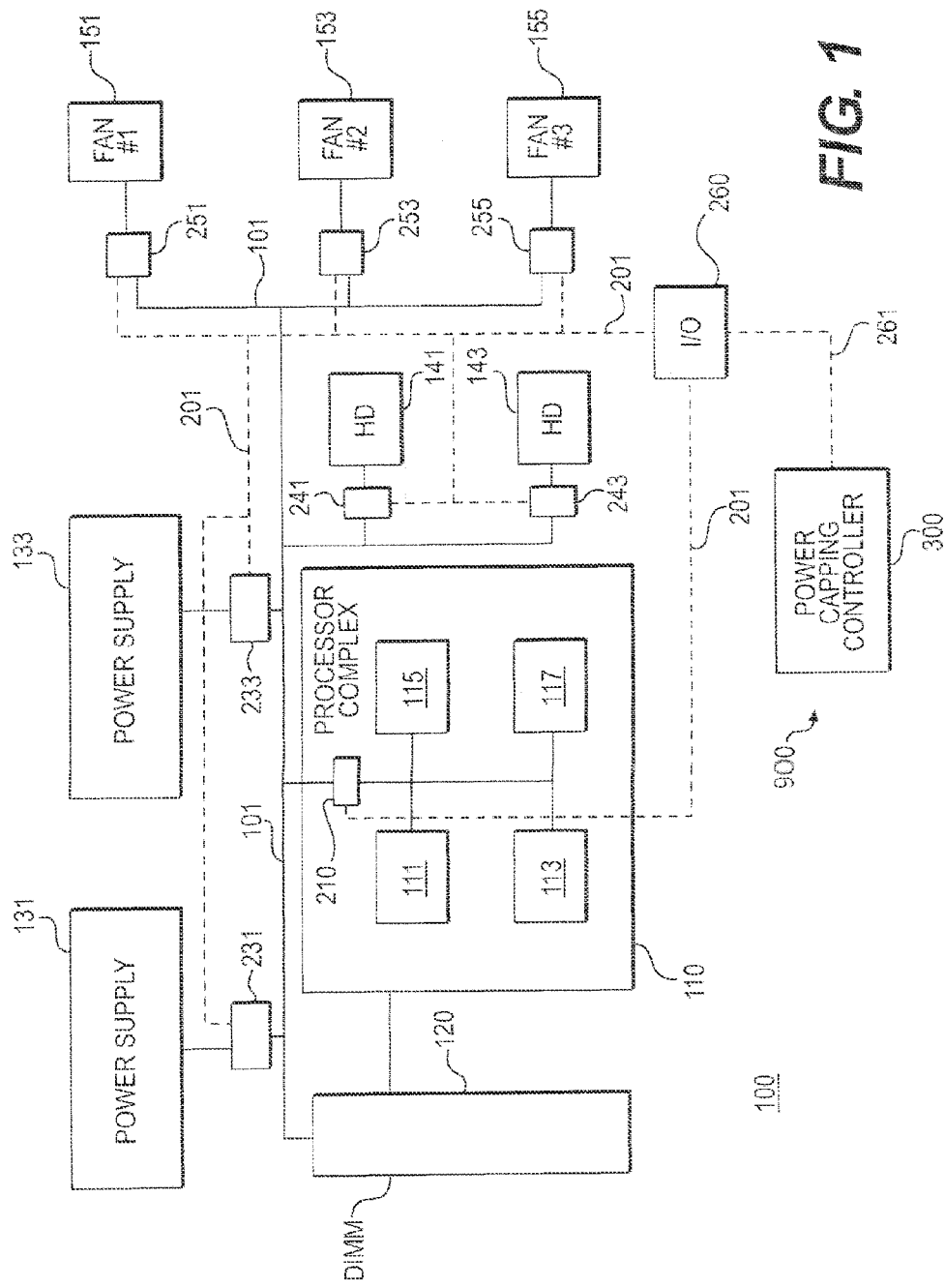
FIG. 1 is a block diagram illustrating a computer system on which an exemplary power capping system is installed and operating.

FIG. 1 is a block diagram illustrating a computer system 100 on which an exemplary power capping system is installed and operating. The computer system 100 shown in FIG. 1 is an idealized system that includes a processor complex 110, with multi-core processors 111, 113, 115, and 117, a dual inline memory module (DIMM) 120, dual power supplies 131 and 133, hard drives 141 and 143 and cooling fans 151, 153, and 155. These components are connected by power supply lines 101. As one skilled in the art understands, the computer system 100 would include other components, which for purposes of clarity, are not shown. In addition, the number of components shown, such as three cooling fans, for example, is only for illustration, and is not limiting. Furthermore the arrangement of components also is illustrative, and many other component combinations and arrangements are possible without deviating from the scope of the inventions as recited in the claims.

The power supplies may be redundant power supplies, and may, for example, be rated at 1,200 watts each, for a total power rating of 2,400 watts. In operation, to derive maximum efficiency from the power supplies, only one power supply would be operating, provided that power supply can meet the demands of the computing system components. Typically, an individual power supply would be operated at about 90 percent of capacity. When additional capacity is required, the second power supply is brought on line.

To implement a power capping regime, an enhanced, exemplary power capping system 200 is shown incorporated into the computer system 100. The power capping system 200 includes individual connections, or switches, in the power supply lines to some or all components ("switched components") of the system 100. The connections or switches may be electronic switches, and in an embodiment, the switches are field effect transistors (FETs). Thus, the power capping system 200 includes FETs 241 and 243 in the power supply lines 101 to the hard drives 141 and 143, respectively, and FETs 251, 253, and 255 in the power supply lines 101 to the cooling fans 151, 153, and 155, respectively. As will be discussed later, these FETs, through a power interrupt signal, may be used to quickly and temporarily disconnect power from the power supplies 131 and 133 to the associated computer system switched components.

Also, as shown in FIG. 1, the switched components may be connected by individual FETs. In an alternate embodiment, switched components of a similar type, such as the fans 151, 153, and 155 may be connected by a single main FET such that when the single main FET is opened, power is removed from all fans simultaneously. In yet another embodiment, groups of fans may be connected by a single FET. In still another embodiment, all switched components may be connected by a single main FET. Reducing the number of FETs to the switched components may reduce the response time of a power interrupt signal, and will reduce the number of hardware components installed with the power capping system 200.

Also part of the power capping system are command/monitor 210 associated with the processor complex 110 and monitors 231 and 233 associated with the power supplies 131 and 133, respectively. The command/monitor 210 is used to monitor workload demand from the processors 111, 113, 115, and 117 and to provide corresponding signals when demand is at or near a predetermined value, or when demand increases at a rate that exceeds a preset value. Determination of these values, and use of the corresponding signals, will be described in detail later. The command/monitor 210 also is used to send commands to the processor complex 110, and possibly to individual processors as part of the power capping process. The monitors 231 and 233 are used to monitor operation of their associated power supplies and to provide a signal upon failure of or fault in a power supply.

The FETs and monitors are coupled to power capping controller 300 through signal and control lines 201, I/O connector 260 and output line 261. As one skilled in the art will appreciate, the control lines 201 may, in reality, comprise multiple, and individual lines, and multiple I/O connections may be used. The control and signal lines are used by the monitors to report information to the power capping controller 300 and to convey control signals to the FETs.

The power capping controller 300, which will be discussed in more detail with reference to FIG. 2, may be incorporated into the computer system 100 or may be a separated component. In an embodiment, the power capping controller 300 is installed on the processor complex 110. In another embodiment, the power capping controller 300 is a separate processor installed within the same enclosure as the computer system 100. In another embodiment, the computer system 100 is but a subset of a larger computer system, and the power capping controller 300 is installed in an overall onboard administrator (OA) module. In this last embodiment, the computer system 100 may be a single blade in a bladed server, with multiple blades under the administrative control of the OA. In addition, in this last embodiment, the arrangement and number of power supplies and fans may vary from what is shown in FIG. 1.

Figure 2:
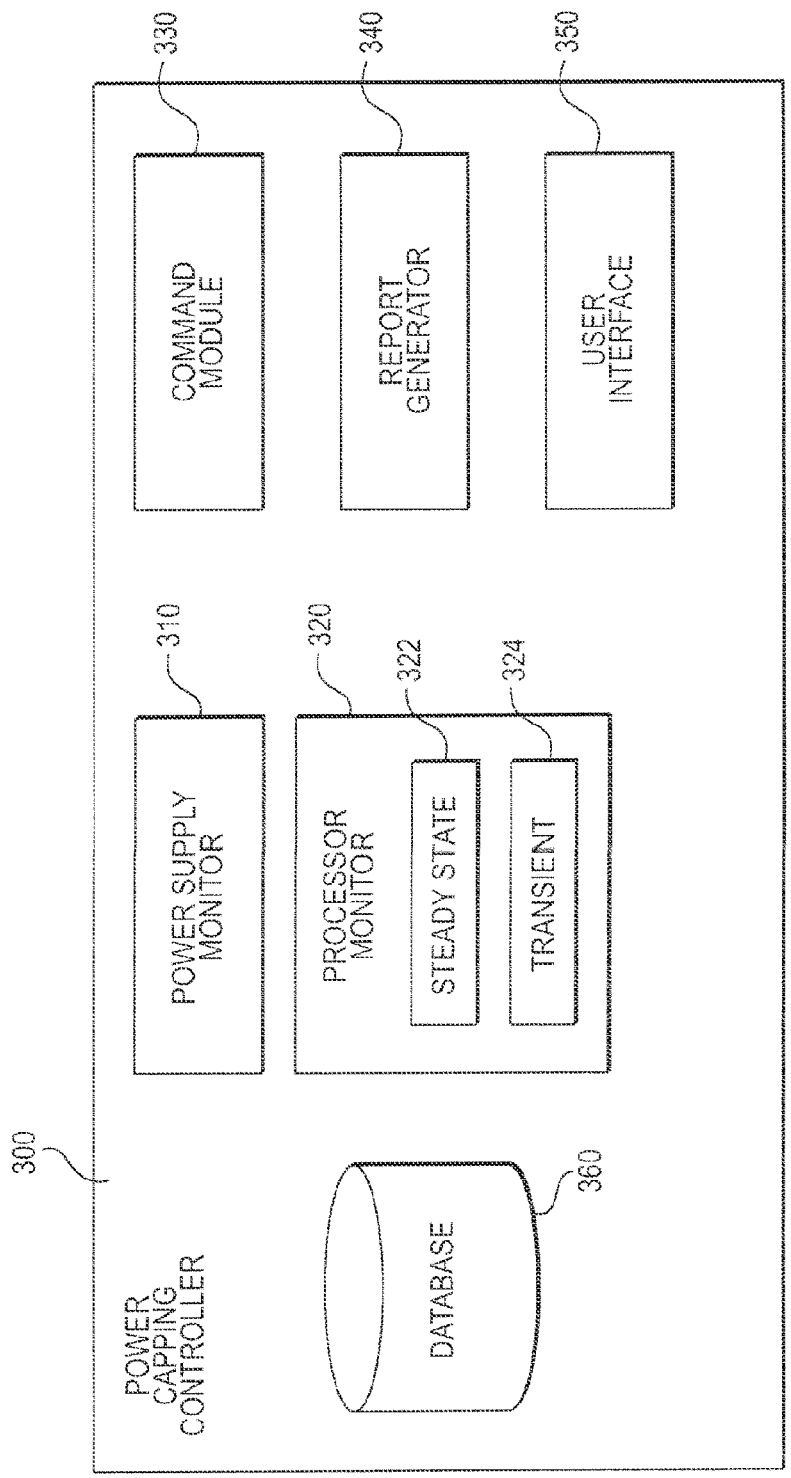
FIG. 2 is a block diagram of an exemplary power capping controller used with the exemplary power capping system of FIG. 1.

FIG. 2 is a block diagram of the exemplary power capping controller 300 used with the exemplary power capping system 200 of FIG. 1. The controller 300 includes a power supply monitor 310, a processor monitor 320, a command module 330, a report generator 340, a user interface 350, and database 360. The power supply monitor 310 receives information from the power supply monitors 231 and 233 regarding the state of their respective power supplies 131 and 133. This information may include, for example, when a power supply is energized or de-energized, what its power output is (in watts or percentage of full power), and ambient temperature. Thus, for example, if one of the power supplies 131 and 133 is inadvertently unplugged, the power supply module 310 will receive a corresponding signal.

The processor monitor 320 is used to monitor operation of the processor complex 110, including the individual processors 111, 113, 115, and 117. In an embodiment, the processor monitor 320 monitors power consumption (in watts) by the processor complex 110. This power consumption monitoring may be implemented in two separate modules: a steady state module 322 and an optional transient module 324. The module 322 receives power consumption information from the processor complex 110 and, in and embodiment, receives power consumption information regarding other power-consuming components in the computer system 100, and compares the power consumption information to an adjustable threshold value and an available power level. The power consumption information for the other power consuming components may be set in the module as a fixed or baseline value, or may be monitored directly or indirectly from the individual components of the computer system 100. For example, when the computer system 100 is operating (power on), the fans 151, 153, and 155 may always be operating, with each drawing 10 watts of power. Accordingly, the module 322 may have a baseline level of 30 watts set into its algorithms to account for power consumption by the fans whenever the computer system 100 is powered on. Alternatively, the module 322 may receive a fan power signal when a fan is powered on, and add 10 watts to the total power consumption to account for this component. The available power level may be supplied by the power supply monitor 310. Thus, for example, if only one of the power supplies 131, 133 is on line at a particular time, the available power level will be reduced compared to that when both power supplies are on line. If the received power consumption information exceeds the threshold value or is approaching the available power limit, the module 322 sends a signal to the command module 330, which, as will be described later, operates to reduce power consumption in the computer system 100.

The transient module 324 monitors power consumption in the computer system 100 as well as the rate of increase or decrease in power consumption. A fast transient increase in power consumption can occur as a result of a sharp increase in workload on the processor complex 110. Alternately, loss of a power supply can have a similar transient effect—power consumption exceeds or soon will exceed the power threshold or the available power supply. If power consumption exceeds an adjustable threshold, the module 324, much like the module 322, will send a signal to the command module 330. In addition, if the rate of change of power consumption is such that, based on current power consumption, the adjustable threshold will be exceeded, or the available power level will be exceeded, the transient module 324 will send a second signal to the command module 330. The rate of change of power consumption may be based on actual change of power (increase in watts per second), and may consider the amount of time from the transient start until the steady state power capping threshold is reached. Thus, the initial power consumption at the start of the transient may be one factor in determining the response to the transient. Starting at a lower initial power consumption may invoke a different response than when starting at a higher initial power consumption.

As an example of a transient response, assume the computer system is drawing 1500 watts of power from the two power supplies, split as 1080 watts from power supply 131 and 420 watts from power supply 133, and that the power supply steady state power capping threshold is 90 percent of total rated power, or 2160 watts. A sudden surge in processor demand causes power consumption from power supply 133 to increase at a rate of 100 watts per second. In a little over six seconds, the power capping threshold will be reached. The transient module 324 may be set with a transient time threshold of five seconds. This transient time threshold may be selected to allow the power capping system to attempt to prevent exceeding the steady state power consumption threshold by also slowing the CPU clock rate and reducing processor frequency, and a transient time of less than five seconds may be judged by the system administrator as too short. Thus, in response to this fast transient, the command module 330 sends a power interrupt signal to the switched components.

In another embodiment, power consumption by computer system components other than the processor complex 100 may be monitored by a separate monitoring system, including one that monitors power consumption by each power-consuming component. In still another embodiment, the expected power consumption from these non-processor components may be estimated at a fixed value that forms a baseline power consumption.

The command module 330 receives input signals from the processor monitor 320 and sends an appropriate signal on signals to various components in the computer system 100. For example, the module 330 may direct the processor complex 110 to shift to a lower operating frequency or to reduce the CPU clock rate. However, such change in operating conditions of the processor complex 110 results in a slow decrease in power consumption, when what might possibly needed is a more rapid decrease in power consumption. Thus, when the transient module 324 senses power above the threshold level, or senses the rate of increase in power consumption to be above a specified amount, one or more different signals are sent from the command module 330, and these different signals perform different functions. In an embodiment, the two signals originating from the command module 330 in response to signals from the transient module are sent to one or more of the FETs 241, 243, 251, 253, and 255 to open the power line 101 from the power supplies 133 and 135 to the components associated with those FETs. This command signal to the FETs will result in the near instantaneous reduction of power consumption in the computer system 100 by causing the associated components to turn off. Once the rate of change of power consumption has been reduced below its preset value, and/or once total power consumption is below the preset steady state threshold value, then the components that were previously disconnected from the power supplies 131 and 133 may be reconnected. Thus, the loss of power to these components (e.g., the fans 150, 153, 155) should be short, perhaps on the order of 50 milli-seconds to a maximum of about 30 seconds. This short duration loss of active cooling within the computer system 100 enclosure should not cause any problems with component-overheating. Similarly, loss of power to the hard drives 141 and 143 will be of short duration and will not adversely affect data storage operations.

The report generator 340 may be used to generate power capping reports, including duration, cause, and components affected. The reports may be provided on an as occurring basis or may be cumulative and historical reports. The user interface 350 allows the system administrator to set the transient and steady state thresholds to be used by the power capping controller 300, to request reports, and to perform other administrative functions associated with the power capping system 200. The database 360 is used to store historical data associated with power capping operations.

Figure 3A:
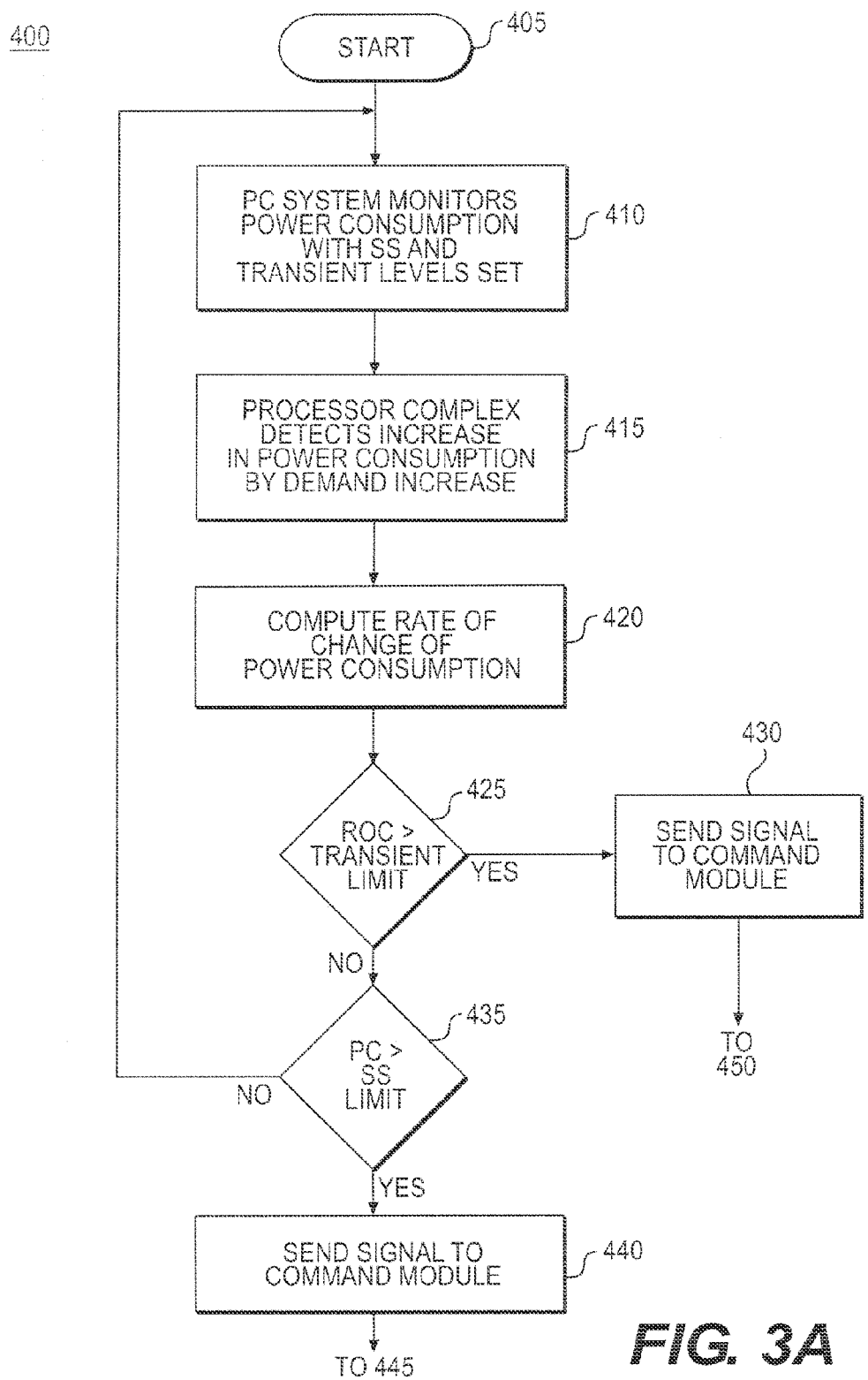
FIGS. 3A and 3B is a flowchart illustrating an exemplary operation of the power capping system of FIG. 1.
Figure 3B:
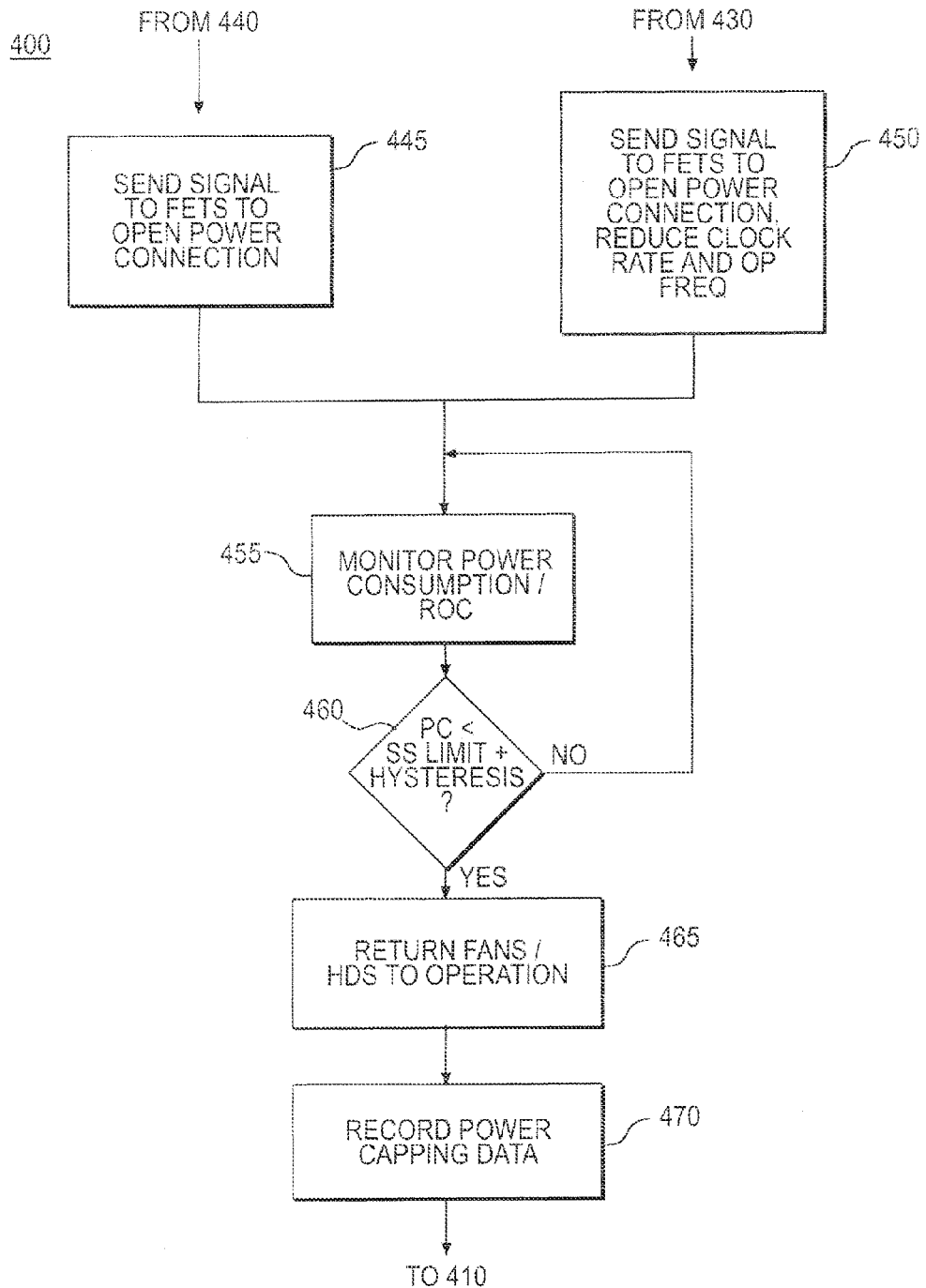

FIGS. 3A and 3B is a flowchart illustrating ah exemplary power capping operation 400 of the power capping system 200. The operation 400 starts with block 405. In block 410, the power capping system 200 monitors power consumption and available power with steady-state or quasi-steady state power consumption and transient power consumption change levels set by a system administrator. In block 415, the processor complex monitor 320 detects an increase in power consumption (as a result of increased processor workload making a demand for more power from the power supplies 131 and 133). The detection of increased power consumption may be manifested by increased current flow through the monitor 210, or a related electrical parameter, such as watts. In block 420, the processor monitor 320 computes rate of change (ROC) of power consumption by the processor complex. In block 425, the transient module 324 determines if the rate of change of power consumption exceeds a variable threshold. If the threshold is exceeded, the operation 400 moves to block 430. In block 430, the processor monitor 320 sends a transient exceeded signal to the command module 430. The operation 400 then moves to block 450. If the threshold is not exceeded, the operation 400 moves to block 435, and the steady state module 322 determines if the power consumption exceeds the steady state threshold. If the steady state limit is not exceeded, the operation 400 returns to block 410, but if the steady state limit is exceeded, the operation 400 moves to block 440. In block 440, the processor monitor 320 sends a steady state threshold exceeded signal to the command module 330. The operation 400 then moves to block 445.

In block 445, the command module 330 formulates and sends a command to one or more of the FETs to cause an open circuit in the power supply line 101. In block 450, the command module 330 send a command to all of the FETs to open the power supply line 101. In addition, the command module 330 directs the processor complex 110 to reduce the CPU clock rate and to operate a reduced operating frequency. Following either block 445 or 450, the operation 400 moves to block 455. In block 455, the power capping system 200 continues to monitor power consumption and transient rate, following disconnection of specified components of the computer system 100 and reduction of clock rate and frequency (if appropriate). In block 460, the power consumption is checked to determine if less than the steady state threshold, plus a hysterises value. If the power consumption is so reduced, the operation 400 moves to block 465, and power is restored to the de-energized computer system components. Clock rate and frequency also may be restored. In block 470, the report generator 340 produces a report of the power capping event, and the data then are stored in the database 360. The operation 400 then returns to block 410.

Although the operation 400 has been described as proceeding according to a specific sequence, those skilled in the art will appreciate that other sequences within the concepts disclosed herein are possible.

The various disclosed embodiments for signal processing associated with the power capping system 200 of FIG. 2 may be implemented as software, hardware, firmware, or any combination of these technologies. The programming may be implemented as one or more modules (also referred to as code subroutines, or "objects" in object-oriented programming). The location of the programming will differ for the various alternative embodiments. The programming for signal processing, for example, may be implemented on the controller 300 or on other components of the computer system 100. The programming may be accessed by the controller 300 from a long-term storage media of some type, such as semiconductor, magnetic, and optical devices, including a removable disk or a hard drive. Alternatively, the programming is embodied in the memory (such as memory of a handheld portable electronic device) and accessed by a processor using a bus. The techniques and methods for embodying programming in memory, on physical media, and/or distributing software code via networks are well known to those skilled in the art.

As a computer-readable medium, the power capping programming may take the form of a computer program product on a computer-usable storage medium having computer-usable program code embodied in the medium. Any suitable computer usable or computer readable medium may be utilized. The computer-usable or computer-readable medium may be, for example but not limited to, an electronic, magnetic, optical, electromagnetic, or semiconductor system, apparatus, device, or medium. More specific examples (a non-exhaustive list) of the computer-readable medium include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

The signal processing methods have described with reference to flowchart illustrations and/or block diagrams of methods, apparatuses (systems) and computer program products. Each block of the flowchart illustrations and/or block diagrams, and combinations of blocks in the flowchart illustrations and/or block diagrams, can be implemented by computer program instructions. These computer program instructions may be provided to a processor of a general, purpose computer, special purpose computer, or other programmable data processing apparatus to produce a result, such that the instructions, which execute via the processor of the computer or other programmable data processing apparatus, create means for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps, for implementing the functions/acts specified in the flowchart and/or block diagram block or blocks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

We claim:

1. A power capping system for use in temporarily capping power consumption in a computer system, the computer system having a plurality of components including at least one power supply and one processor, the power capping system, comprising:
   a plurality of power monitors, each power monitor associated with at least one component of the computer system;
   one or more switches, each switch associated with at least one of the components; and
   a power capping controller comprising programming to implement a power capping method, the programming, comprising:
      a power supply monitor that monitors availability of power to the plurality of components from the power supply,
      a processor monitor that monitors power demand by the processor and that generates a power reduction signal when a power-related threshold is reached by checking at least a transient module that compares a rate of change of power consumption to a transient threshold, and
      a command module that receives the power reduction signal and generates a first power reduction command to open at least one of the switches, whereby power consumption in the computer system is reduced.

2. The system of claim 1, wherein the processor monitor comprises:
   a steady state module that compares power consumption levels to a steady state threshold and generates a first signal when the steady state threshold is reached; and
   a transient module generates a second signal when the transient threshold is reached, wherein the power reduction signal comprises one or both of the first and second signals.

3. The system of claim 1, wherein the plurality of components include computer system cooling fans and the switches are associated with the computer system cooling fans, and when opened, the switches remove power to the computer system cooling fans.

4. The system of claim 3, wherein each of the cooling fans is provided with a switch.

5. The system of claim 4, wherein selected computer system cooling fans are de-energized.

6. The system of claim 3, wherein all of the computer system cooling fans are controlled through a single main switch.

7. The system of claim 1, wherein the plurality of components include computer system hard drives and the switches are associated with the computer system hard drives.

8. The system of claim 1, wherein the switches are FETs.

9. The system of claim 1, wherein the command module provides a second power reduction command that reduces a clock rate and processor frequency.

10. The system of claim 2, wherein when power consumption is reduced below the steady state threshold, the command module directs the switches to dose thereby restoring power to the components.

11. The system of claim 2, wherein the computer system comprises at least two equally rated power supplies, wherein loss of one of the at least two power supplies automatically reduces the steady state power consumption threshold.

12. A method for temporarily capping power consumption in a computer system that includes at least one power supply, at least one processor, and one or more switched components coupled to the power supply by one or more switches, the method comprising the steps of
   determining availability of the power supply,
   determining power consumption in the computer system, wherein the determined power consumption is less than a power consumption threshold, wherein the power consumption threshold is a transient threshold;
   detecting an increase in power consumption in the computer system, wherein a level of power consumption exceeds the power consumption threshold;
   opening one or more of the switches to de-energize one or more of the switched components, whereby power consumption in the computer system is reduced;
   determining a rate of change of power consumption;
   comparing the determined rate of change of power consumption to the transient threshold; and
   when the transient threshold is reached, opening the one or more switches.

13. The method of claim 12, wherein when power consumption is reduced below a steady state threshold, the method further comprises closing the switches thereby restoring power to the switched components.

14. The method of claim 12, wherein the switched components are computer system cooling fans, and when opened, the switches remove power to the cooling fans.

15. A power capping system to temporarily cap power consumption in a computer system, the computer system having a plurality of components including at least one power supply and one processor, the power capping system, comprising:
   a plurality of power monitors, each power monitor associated with at least one component of the computer system;

one or more switches, each switch associated with at least one of the components; and a power capping controller comprising programming to implement a power capping method, the programming, comprising:
- a power supply monitor that monitors availability of power to the plurality of components from the power supply,
- a processor monitor that monitors power demand by the processor and that generates a power reduction signal when a power-related threshold is reached wherein the processor monitor comprises:
  - a steady state module that compares power consumption levels to a steady state threshold and generates a first signal when the steady state threshold is reached, and
  - a transient module that compares a rate of change of power consumption to a transient threshold and generates a second signal when the transient threshold is reached, wherein the power reduction signal comprises one or both of the first and second signals; and
- a command module that receives the power reduction signal and generates a first power reduction command to open at least one of the switches, whereby power consumption in the computer system is reduced.

16. The system of claim 15, wherein when power consumption is reduced below the steady state threshold, the command module directs the switches to close thereby restoring power to the components.

17. The system of claim 15, wherein the computer system comprises at least two equally rated power supplies, wherein loss of one of the at least two power supplies automatically reduces the steady state power consumption threshold.

18. The system of claim 15,
wherein the plurality of components include computer system cooling fans and the switches are associated with the computer system cooling fans, and when opened, the switches remove power to the computer system cooling fans,
wherein each of the cooling fans is provided with a switch, and
wherein selected computer system cooling fans are de-energized.

19. The system of claim 18, wherein all of the computer system cooling fans are controlled through a single main switch.

20. The system of claim 15, wherein the command module provides a second power reduction command that reduces a clock rate and processor frequency.

* * * * *

UNITED STATES PATENT AND TRADEMARK OFFICE
CERTIFICATE OF CORRECTION

PATENT NO. : 8,782,450 B2  
APPLICATION NO. : 13/262809  
DATED : July 15, 2014  
INVENTOR(S) : Darren J. Cepulis et al.

Page 1 of 1

It is certified that error appears in the above-identified patent and that said Letters Patent is hereby corrected as shown below:

In the Claims:

In column 8, line 26, in Claim 10, delete "dose" and insert -- close --, therefor.

Signed and Sealed this
Eighteenth Day of November, 2014

Michelle K. Lee
*Deputy Director of the United States Patent and Trademark Office*